United States Patent [19]

Chamberlain

[11] 4,354,390
[45] Oct. 19, 1982

[54] TRACTOR PULL SLED

[75] Inventor: Robert A. Chamberlain, Custar, Ohio

[73] Assignee: Northwestern Ohio Tractor Pullers Assoc., Bowling Green, Ohio

[21] Appl. No.: 162,083

[22] Filed: Jun. 23, 1980

[51] Int. Cl.³ .............................................. G01I 5/13
[52] U.S. Cl. ............................... 73/862.03; 172/388; 280/9
[58] Field of Search .............................. 172/387, 388; 73/862.03; 280/8, 9, 11

[56] References Cited

U.S. PATENT DOCUMENTS

| | | | |
|---|---|---|---|
| 2,521,330 | 9/1950 | Berra et al. | 280/11 |
| 3,491,590 | 1/1970 | Watkins | 73/141 |
| 3,633,413 | 7/1970 | Case | 73/141 |
| 3,659,455 | 5/1972 | Watkins | 73/141 |
| 3,667,291 | 6/1972 | Peak | 73/141 |
| 3,741,010 | 6/1973 | Luedtke | 73/141 |
| 3,967,496 | 7/1976 | Luedtke | 73/141 |
| 4,296,840 | 10/1981 | Payne | 188/8 |

OTHER PUBLICATIONS

Harms et al., Sled "Applicant's Response to Submission Pursuant to 37CFR 1.11B by Protestors", filed Oct. 12, 1977, p. 16 et seq.
Harms Sled, as disclosed in the file history of the reissue application of Billy K. Watkins, Ser. No. 841,583.

Primary Examiner—Joseph F. Peters, Jr.
Assistant Examiner—Michael Mar
Attorney, Agent, or Firm—Wilson, Fraser, Barker & Clemens

[57] ABSTRACT

A sled for use in tractor pulling contests, and the like, comprising a frame supported on front and rear wheels, a ballast mass supported by the frame, a pan adapted for sliding frictional engagement with the ground, and an articulated linkage mechanism for transfering the weight of the ballast from the wheels to pan. As the sled is pulled, the linkage mechanism, which is driven by rotation of the rear wheels, progressively shifts the weight of the sled from the wheels to the pan, by lowering the pan relative to the frame. The suspension springs for the rear axle have a greater vertical stroke than those for the front. Therefore, although the front wheels may ultimately be completely lifted from the ground during the weight transfer, the rear wheels always contact the ground with a force sufficient to drive the linkage mechanism.

4 Claims, 5 Drawing Figures

TRACTOR PULL SLEDsu

BACKGROUND OF THE INVENTION

Tractor pulling contests have become increasingly popular. Originally merely a local activity, popular at county fairs for competition among actual agricultural machines, tractor pulling is now an important motor sport in its own right. Championships on state and nation levels are contested among machines that will never pull a combine, some of them capable of producing over two thousand horsepower. For such high level competition, accurate measuring devices are essential. The old fashioned simple sled to which weights were progressively added during a competition is obsolete.

Current competition requires a sled which will progressively increase its frictional force on the ground as it is pulled by a tractor, until ultimately the tractor is stopped by the drag. A common type of sled device suitable for such competition is examplified by the disclosure in U.S. Pat. No. 3,491,590 to Billy K. Watkins. The Watkins sled, and others based on the same principle, comprises a frame supported on the rear end by wheels, on its front end by a ground engaging pan or sled. A ballast box is rolled on tracks or rails carried by the frame from the rear of the sled, adjacent the rear wheels, to the front of the sled, adjacent the ground engaging pan. As the sled is pulled, the ballast box is automatically shifted from the rear to the forward position, thereby progressively increasing the weight supported by the pan, and thus the frictional drag. The ballast box may be moved forward by geared-down rotation of the sled's rear wheels, or by a pulley and cable arrangement, attached to a dead-man stake anchored to the ground behind the sled. The following U.S. patents all disclose similar devices in which a ballast box is moved forward on a frame relative to rear wheels, a distance proportional to the distance which the sled device is pulled.

U.S. Pat. No. 3,491,590—Watkins
U.S. Pat. No. 3,633,413—Case
U.S. Pat. No. 3,659,455—Watkins
U.S. Pat. No. 3,667,291—Peak
U.S. Pat. No. 3,741,010—Luedtke
U.S. Pat. No. 3,967,496—Luedtke All of these devices shift the center of gravity forward from a rear wheel support to a front ground-engaging slidable support.

However, sleds of this design have drawbacks. Typically, many tons of ballast are necessary, yet the most powerful tractors will still attain speed of perhaps 40 mph (65 km/h) before being stopped by the drag of the sled. At such speeds, a large weight shiftably mounted on the sled and moving relative to the sled is obviously dangerous. This danger is recognized by the National Tractor Pullers Association, whose rules require that . .

"Each sled must have two complete sets of stops at the front of the rails. Stops shall be made of substantial material, strong enough to halt a fully loaded free wheeling weight box, and be securely fastened to the transfer."

Nevertheless, despite precautions, the danger in this device is inherent. Returning the massive ballast box on its rails across the length of said sled also presents opportunities for accidents.

There is, accordingly, a need for a tractor pull sled capable of providing increasing fictional drag with the ground during a pull, without requiring any significant movement of a ballast means relative to the sled.

SUMMARY OF THE INVENTION

The invention provides a tractor pulling sled producing progressively increasing drag as it is pulled, but eliminating the necessitity for longitudinal movement of a ballast box on the sled frame. The invention comprises a ballasted frame supported at both ends on wheels, a ground engaging pan vertically shiftable relative to the frame, and an articulated linkage for shifting the pan downwardly relative to the frame. Leaf springs between the wheel axle and the frame suspend the weight of the frame and ballast over the wheels. As the sled is pulled forward, the rotational motion of the rear wheels is translated by gears and drive chains into a linear force which operates the linkage mechanism. The parallelogram linkage is articulated between the frame and the ground engaging pan. As the linkage expands, therefore, the pan is first lowered to the ground, then the frame is pushed upwardly from the pan. As the frame and ballast rise, progressively less of their weight is transmitted through the leaf springs to the wheels, and more is transmitted through the linkage mechanism to the pan. Ultimately, the front wheels of the sled are lifted completely off of the ground, and are suspended from the frame on the leaf springs. The suspension of the rear wheels is adapted to maintain the rear wheels' contact with the ground, so that the drive mechanism will continue to be driven.

BRIEF DESCRIPTION OF THE DRAWINGS

The above objects and advantages of the invention will become apparent to one skilled in the art from reading the following detailed description of an embodiment of the invention when considered in light of the accompanying drawings, in which.

DESCRIPTION OF THE PREFERRED EMBODIMENT

Figure 1:
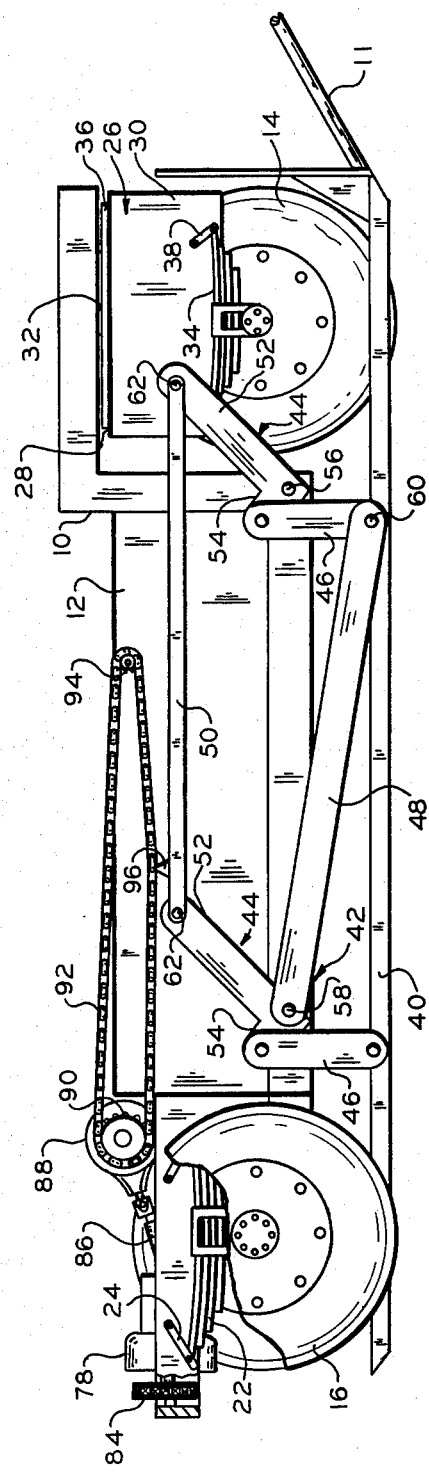
FIG. 1 is a side elevational view of a tractor pull sled embodying the invention, shown with the skid retracted, as at the start of a pull.
Figure 2:
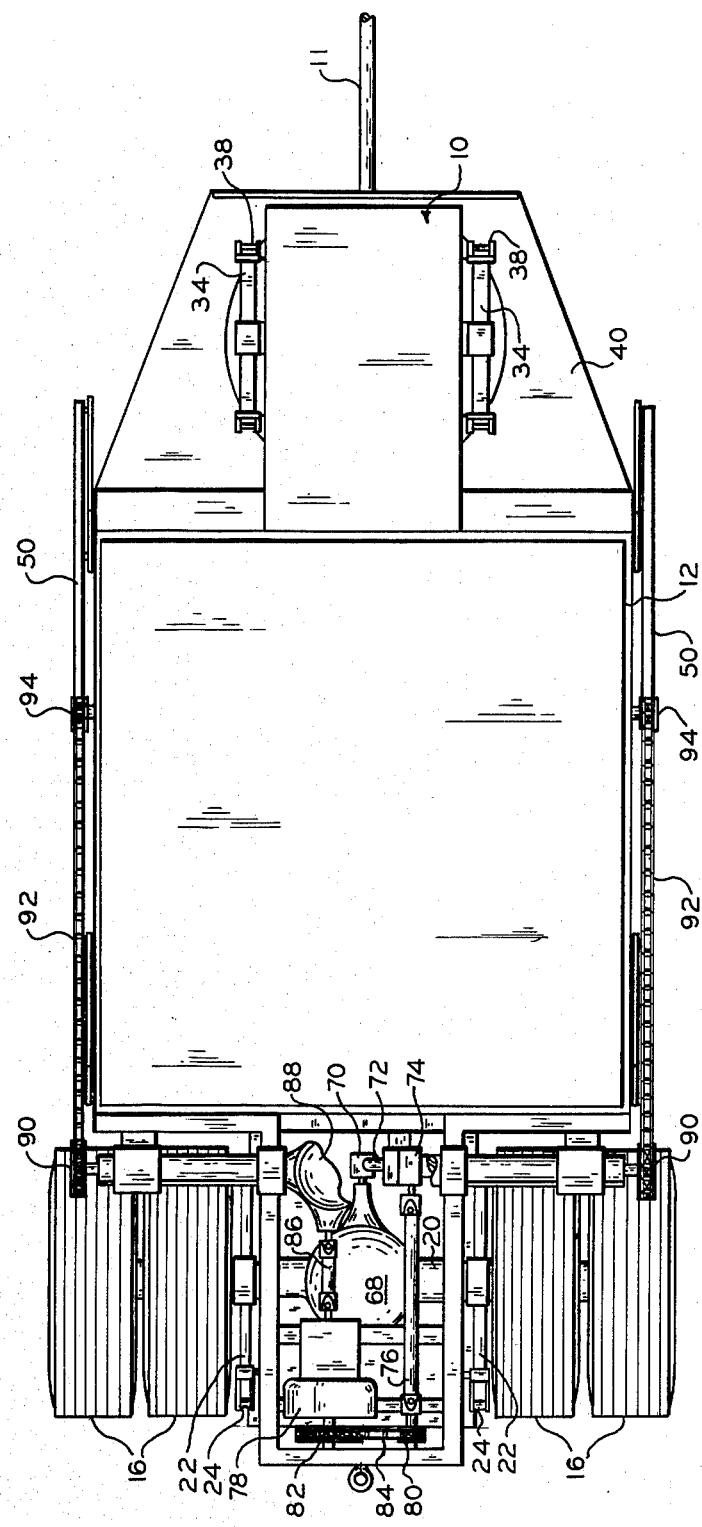
FIG. 2 is a top plan view of the sled device illustrated in FIG. 1.
Figure 3:
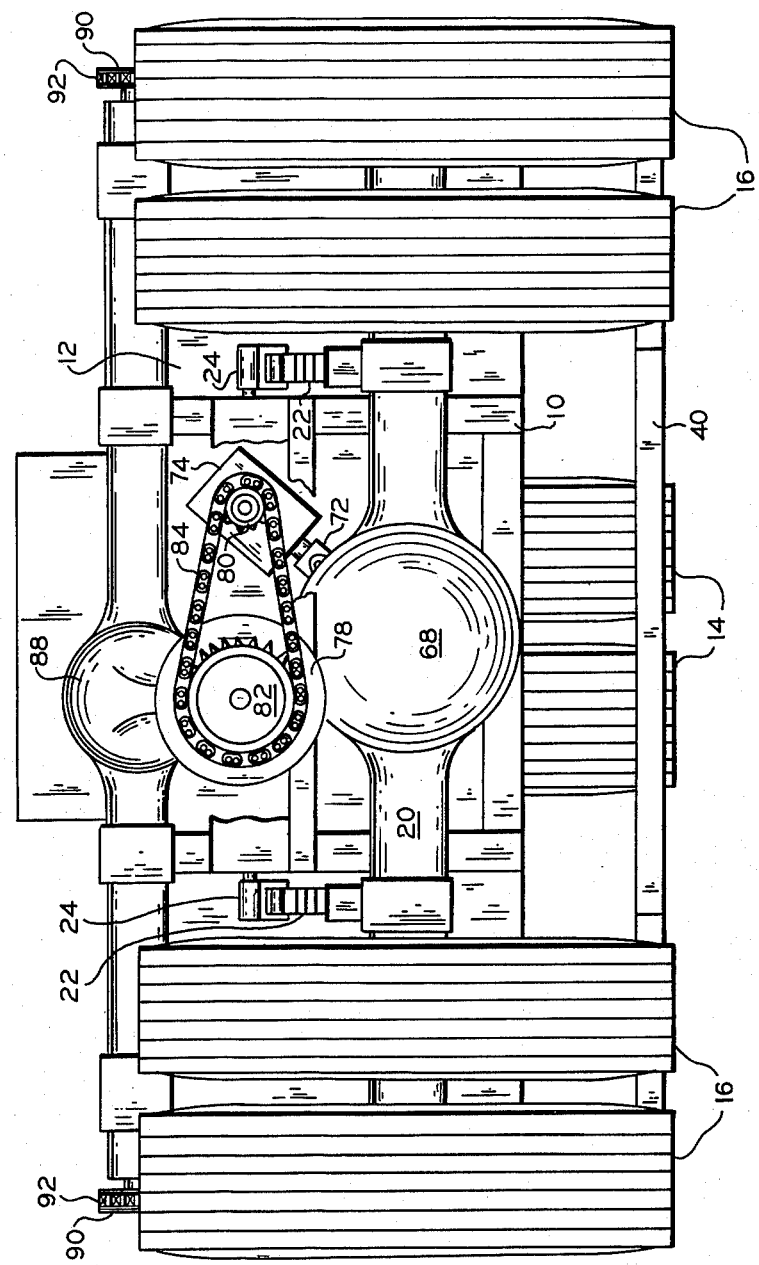
FIG. 3 is a rear elevational view of the tractor pull sled illustrated in FIGS. 1 and 2, showing the transmission components in detail.
Figure 4:
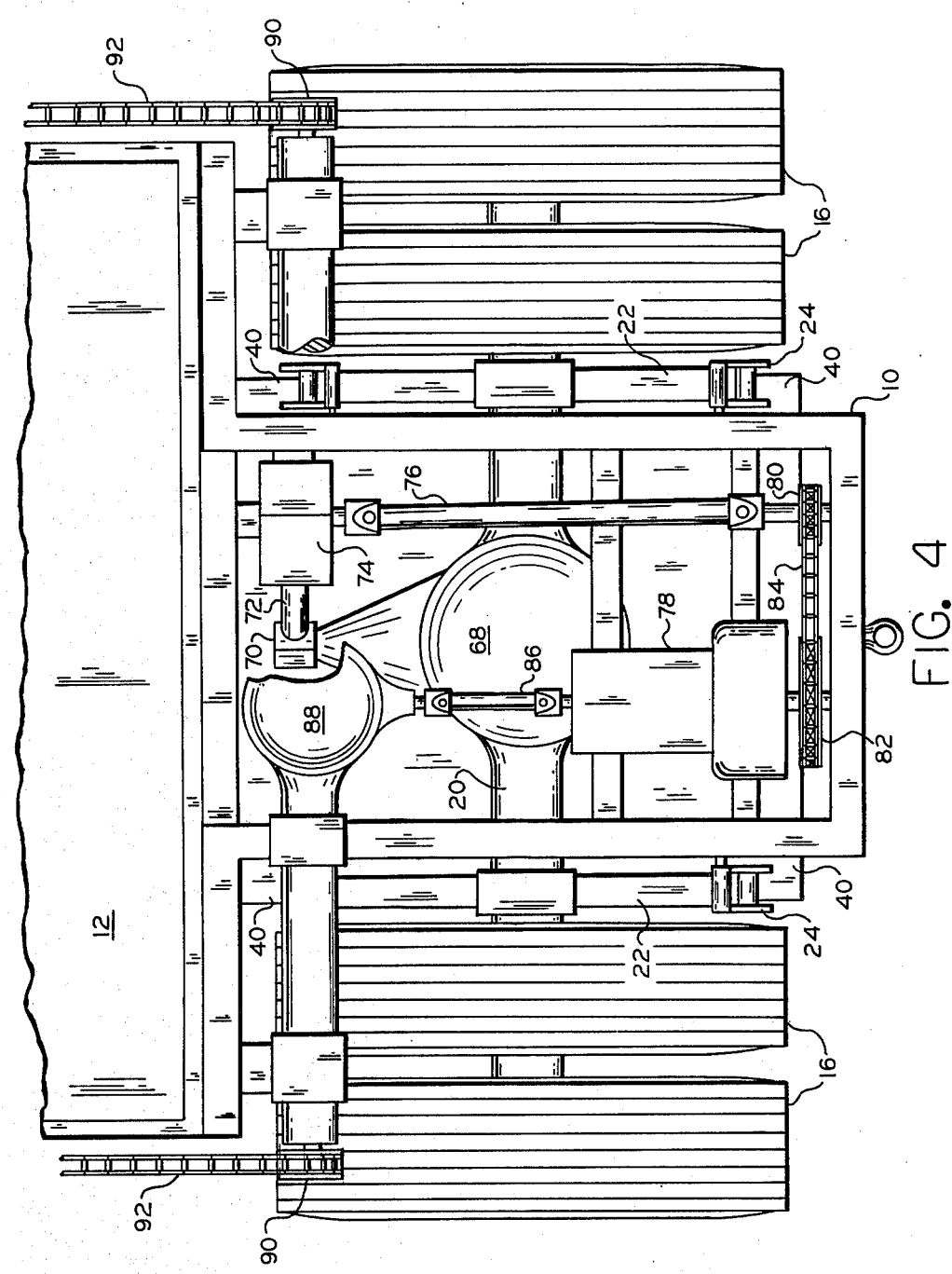
FIG. 4 is an enlarged fragmentary top plan view of the structure illustrated in FIG. 2, illustrating in detail the rear suspension and the transmission system.

As illustrated in the drawings, a tractor pull sled embodying the invention generally comprises a frame 10 supporting a ballast box 12, wherein the frame 10 is provided with front ground engaging wheels 14 and rear ground engaging wheels 16. The rear wheels 14 are adapted to rotate on a conventional, heavy duty, transmission axle assembly 20. Leaf springs 22 suspend the rear of the frame 10 over the rear axle assembly 20. The rear end of the leaf springs 22 are conventionally attached to the frame 10 by suitable pivotable shackles 24.

The front of the frame 10 is similarly suspended on the front wheels 14. The front wheels 14 are castermounted on a wheel carriage 26, comprising a top plate 28 and side wheel support plates 30 depending therefrom. The wheel carriage 26 is pivotable about a vertical shaft 32 which pivotally connects the front wheel carriage 26 to the frame 10. Because the vertical axis of the shaft 32 is forward of the horizontal axis of the front wheel rotation, the sled is self-steering to some extent as it is towed forwardly. The wheel carriage 26 is suspended on the front wheels 14 by leaf springs 34 between the wheels 14 and the side support plates 30. Leaf springs 34 are secured to the wheel carriage 26 on pivotable shackles 38, in the same manner as rear springs 22 are mounted.

A pan or skid 40 is shiftably mounted on the bottom of the frame 10, by means of a pair of articulated parallelogram linkages 42, respectively disposed on each side of the frame 10. At the start of a pull, the linkages 42 hold the skid 40 in the extreme retracted position illustrated in FIG. 1, in which the skid 40 contacts the ground only lightly if at all. As the sled is pulled forward, the linkages 42 are automatically extended, in a manner to be described, to the position illustrated in FIG. 5. In this final extended position, the skid 40 is in contact with the ground, and the linkages 42 support the frame 10 on the skid 42.

Each linkage 42 comprises two L-shaped levers or lift arms 44, two skid struts 46, a diagonal linkage arm 48, and a cross bar 50. Each L-shaped lever 44 has a long lever arm 52 and a short lever arm 54 perpendicular to each other. On each side of the frame 10, one L-shaped lever 44 is mounted towards the front of the frame on a pivot pin 56, and a second L-shaped lever 44 is mounted towards the rear of the frame 10 on a pivot pin 58. To support the frame 10 on the skid 40, struts 46 are provided. Each strut 46 is pivotally attached on one end to a short lever arm 44 of a L-shaped lever 44 and pivotally attached at its other end to the skid 40. Each linkage arm 48 is attached at one end to the pin 58 which also provides a fulcrum for the rear L-shaped lever 44 and at its front end to a pin 60 which also pivotally attaches the front support strut 46 to the skid 40. At the top of each linkages 42, a cross bar 50 is pivotally attached on pins 62 to the respective ends of the long arms 52 of the L-shaped levers 44. The distance between the pivot pins 62 is the same as the distance between the pivot pins 58 and 56. The pivot pins which mount the struts 46 to the skid 40 and the lever arms 44 are similarly spaced to provide an articulated parallelogram linkage.

The rear wheels 16 drive a transmission system which automatically operates the linkages 42 as the sled is pulled or moved forward. The rear axle assembly 20 includes a differential 68 which produces a rotary output. The output is transmitted through gear box 70, an associated drive shaft 72, gear box 74, and an articulated drive shaft 76. The drive shaft 76 drives a conventional multi-gear transmission 78 through sprockets 80 and 82 and an interconnecting chain 84. The transmission 78 is connected through a drive shaft 86 to a second differential 88 secured to the top of the frame 10. The output of the differential 88 drives two sprockets 90 respectively located on each side of the frame 10. Each sprocket 90 drives an associated chain 92 which extends between the sprocket 90 and a smaller idler sprocket 94 pivotally mounted on the forward portion of the frame 10. The chains 92 provide the final linear force necessary to actuate the linkages 42. A bracket 96 interconnecting the chain 92 and the cross bar 50 transmits this force to the respective linkage assembly 42.

The gear box 70, shaft 72 and gear box 74 are all fixed relative to the axle assembly 20. However, the transmission 78, and sprockets 80 and 82 are mounted on the frame 10, which is movable relative to the axle assembly 20 on leaf springs 22. Therefore, the drive shaft 76 between the gear box 74 and sprocket 80 is provided with universal joints at both ends and an expansible sleeve to provide the required flexibility.

At the start of a pull, the sled is in the position illustrated in FIG. 1. As the tractor being tested pulls the sled forward by a draw bar 11, the rotation of the rear wheels 16 of the sled drives the transmission system and ultimately the chain 92, as described. The chain 92 causes the cross bar 50 to be moved longitudinally toward the rear of the frame 10. The cross bar 50, in turn, moves the long arms 52, pivoting the L-shaped levers 44 on their fulcrum pins 56 and 58. Skid struts 46 are thereby forced downwardly, thus lowering the skid 40 into engagement with the ground. As the L-shaped levers 44 continue to pivot, the frame 10 is lifted upwardly on the skid 40, supported by the struts 46 and the short arms 54 of the levers 44. The downward force of the frame 10 and the ballast box 12 against the skid 40 is thereby increased. As the frame 10 rises the leaf springs 22 and 34 become less compressed and thus exert less downward force on their associated wheels. Thus the extension of the linkages 42 effects a transfer of the weight of the frame 10 and the ballast 12 from the wheels 16 and 14 to the skid 40, resulting in a downwardly directed force against the skid 40, reacted by the ballasted frame 10.

Even if the linkages 42 are completely extended during a pull, the movement of the ballast box 12 relative to the rest of the sled is insignificant. Specifically, in the proposed design, the linkages 42 are adopted to be extended downwardly from the frame approximately 8½ inches (216 mm).

Figure 5:
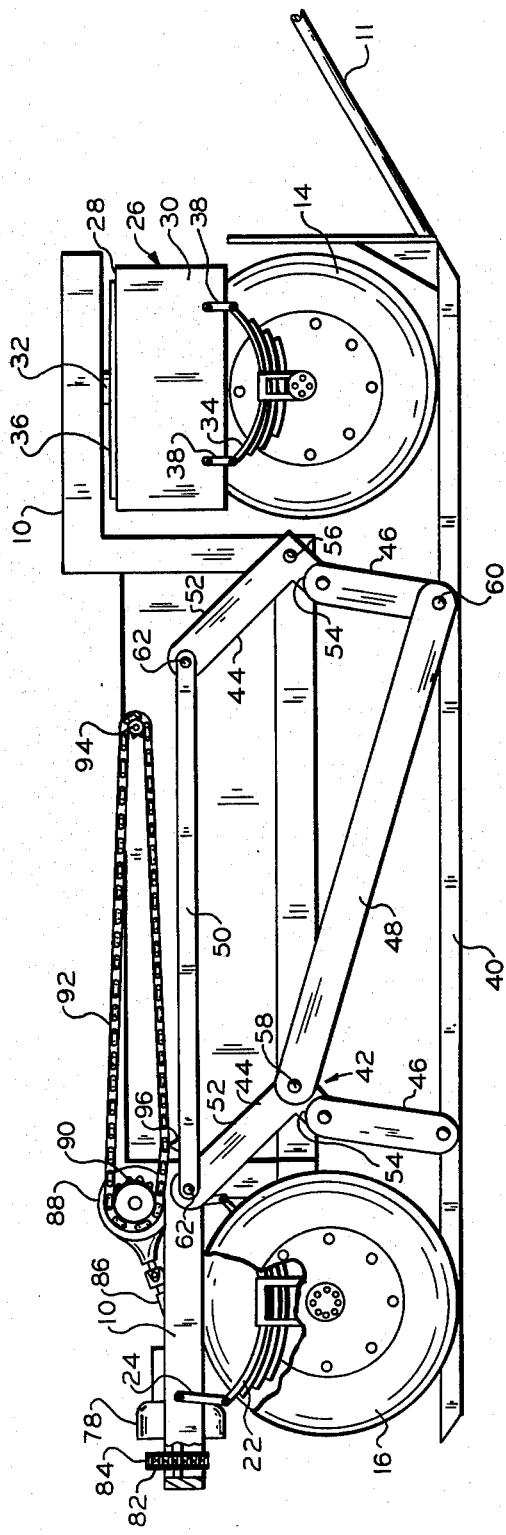
FIG. 5 is a side elevational view similar to FIG. 1, with portions broken away to move clearly shown certain features, illustrating the skid fully extended to a ground engaging position, as at the end of a pull.

In the case of the front wheels 14, the transfer of weight may be complete, and the wheels 14 may be lifted off the ground at the end of a pull. The rear wheels 16, however, must always carry sufficient weight to enable them to drive the associated power transmission system. Relatively long shackles 24 mounting the rear leaf spring 22 allow the rear springs 22 a greater vertical stroke than the front leaf spring 34. Thus, when the linkages 42 are completely extended, as illustrated in FIG. 5, the rear wheels 14 still contact the ground sufficiently to effect the operation of the power transmission system.

The relatively short shackles 38 carrying the front leaf springs 34 restrict the vertical movement of the leaf springs 34. When the front leaf springs 34 reach the limit of their vertical stroke and the frame 10 continues to rise, the leaf springs 34 lift the front wheels 14.

Thus, as the sled is moved forwardly, weight is transferred from wheels 14 and 16 providing relatively low rolling resistance to the skid 40 which provides a relatively high frictional drag. Depending on the distance of pull desired and the power of the tractor being tested, the amount of ballast and the gear ratios in the transmission may be adjusted so that the friction of the sled ultimately overcomes the traction force of the pulling tractor. To avoid damage to the apparatus if a tractor is capable of continuing to pull the sled after the linkage 42 are fully extended, the sled may be provided with an automatically actuated clutch in the transmission system. When the levers 44 reach the desired limit of travel, the lever 44 would typically contact a clutch lever and disengage a conventional clutch in the bell housing of the multi-gear transmission 78. A brake also activated by the lever arm 44 could be employed to prevent the skid 18 from retracting under the weight of the ballast box 12 after the clutch is disengaged and the chain 92 is no longer driven by the transmission 78.

When the sled is returned to the starting line to be pulled by another tractor in a competition, the linkages 42 should be returned to their original position to assure the same starting conditions for each tractor. A second automatically actuated clutch and brake lever limiting the movement of a lever 44 would typically accomplish this realignment. To return the sled, a clutch in the transmission 78 would first be manually disengaged. The weight of the ballast would automatically cause the frame 10 to lower and the linkages 42 to partially retract. Next, the clutch would be re-engaged and the sled towed backwards towards the starting line. Driven by the reverse rotation of the rear wheels 16, the linkages 42 would continue to retract until a lever arm 44 reached the limit defined by the second brake and clutch lever. The clutch would be automatically disengaged, and the brake automatically actuated to prevent any further movement of the skid 18 relative to the frame 10, as the sled was returned to the starting line.

From the foregoing detailed description, it may be seen that a sled embodying the present invention yields a progressively increasing drag as it is pulled during a contest, but does not utilize an inherently dangerous sliding mass which moves longitudinally on the sled. No dead-man stake or cable and pulley arrangement is necessary to shift a large mass relative to the sled. If any malfunction or breakage were to occur, the frame 10 typically would merely descend several inches from a position of support on the linkages 42 and the skid 40 to a position of support on the wheels 16 and 14 and the associated springs 22 and 34, respectively. In contrast, a breakage or failure in currently used tractor pull sleds can result in the ballast trolly freewheeling out of control on rails carried by the sled.

In accordance with the provisions of the patent statutes, the principle and the mode of operation of the invention have been explained, and what is considered to represent its best embodiment has been illustrated and described. It should however be understood that the invention may be practiced otherwise then as specifically illustrated and described without departing its spirit or scope.

What is claimed is:

1. A tractor pull sled comprising a frame; ground engaging means including front and rear wheels adapted for relatively low frictional movement over the ground; spring suspension means between said frame and said ground engaging means, whereby the weight of the frame is initially supported through said suspension means by said ground engaging means; a skid shiftably mounted on said frame and adapted for relatively high frictional ground engagement; and expansible means between said frame and said skid responsive to the movement of said ground engaging means for shifting said frame relative to said skid and said ground engaging means to progressively transfer the weight of said frame from said ground engaging means to said skid at a rate of which is a function of the distance of forward travel of said sled, wherein said suspension means permits relative vertical movement of said frame and said rear wheels such that said rear wheels are in continuous ground engagement.

2. The invention as defined in claim 1 wherein said means attaching said skid to said frame comprises an extensible articulated linkage system.

3. The invention as defined in claim 2 including a transmission system operatively interconnecting said wheels and said linkage, whereby said linkage is actuated in response to the motion of said rear wheels.

4. The invention as defined in claim 3 including suspension means between said frame and said rear wheels.

* * * * *